(12) United States Patent
(Fish) or Fisk

(10) Patent No.: X4464
(45) Date of Patent: Jun. 9, 1826

(54) BRICK, MOULDING

(76) Inventor: Ezra (Fish) or Fisk

Ezra Fisk and Benjamin Hinkley.

The Schedule referred to in these Letters Patent & making part of the same, containing a description in the words of the said Ezra Fisk & Benjamin Hinkley themselves of their improvement in the machine for moulding bricks & tile.

---

The machine consists of a grinder & a moulder which are connected in their construction & operation. The grinder is a square box, which is forty inches square inside, & three feet deep. Four posts of timber that are seven inches square, are erected in the corners of the box extending three feet below, & thus form legs to support the grinder. These legs are connected by suitable girths; on two opposite sides, the girths are inserted at the bottom of the box to support the floor of the grinder. On the other sides, the girths are inserted eight inches below the floor girths. The floor girths are also connected in the middle by a girder that aids in supporting the floor. The box is lined from the top downward contracting the size of the box six inches each way, leaving a space of one foot unlined in the lower part of the box.

A vertical shaft works in the centre of the box. This shaft which is five feet long, & eight inches diameter, is secured by a suitable binder that passes across the top of the box. The lower end of the shaft passes thro' a circular aperture in the floor and an iron gudgeon in the end of the shaft works in the girder beneath. The circumference of the shaft is divided into eighths by parallel lines drawn at the points of eighths from the lower end upward to the top of the box. Lines are also drawn spirally round the shaft, so as to leave a space of four inches between them. Perforations are made of a suitable size, say one & a half inch) at all points where the lines intersect each other, & knives are inserted in all their perforations.

The knives that work in the hind part of the box are narrow; but those that work in the lower part of the box are pressure-knives being eight in number, & eight inches wide at the outward ends, but taper down to three inches in width at the shaft, extending outward till they come nearly in contact with the insides of the box. The pressure knives lay in an inclined position, the edges rising above the backs in an angle of about forty degrees, & the backs which are two inches thick rise one inch from the floor.

The moulder consists of a receiver, which is an oblong box that receives the mortar as it is pressed from the grinder thro' an aperture in the lower part of the grinder box; and a conductor, which is a sort of grating, thro' the apertures of which the mortar passes into the brick moulds. The receiver is six inches deep, the width correspond-ing to the length of the brick & length of it corresponding to the length of the flasket of brick moulds. in one side of the receiver, is an opening four inches deep, extending the whole length of the box, & leaving a bar above & below the opening, which bars serve to connect the ends of the box on that side. The apertures in the conductor correspond in form, size & number to the moulds in the flasket to be used, but the partitions between the apertures in the grating are one inch thicker or one inch shorter than the partitions between the brick moulds.

The side pieces of the grating & also the bars are excavated. the excavations are filled with sponge & the whole covered with course strong woollen cloth, the upper & lower edges of the cloth being confined to the wood by tacks. A small sink sufficient to contain one gallon, is placed in front of the grating for the purpose of supplying the sponges with water, which is conveyed in small tubes from the sink, thro' corresponding perforations made in the front piece of the grating. The pressure of the mortar as it passes
thro' the grating causes the water to ooze out thro' the cloth,
which facilitates the discharge of the bricks from the moulds.
The grating may be used with or without the sponge accord
ing as the clay shall require. To connect the moulder
with the grinder, the conductor is attached to one side, or it
may be attached to two opposite sides of the grinder, rest-
ing upon arms which extend outward from the posts of
the grinder. The grating is so stationed that the up
per side of it falls an inch & a half below the upper
side of the floor of the grinder. The receiver sits upon
the grating, the open side coming in close contact with
the side of the grinder; the opening in the side of the
receiver corresponding exactly to a like opening made in
the side of the grinder at the bottom. The grating is
secured in its place by iron bolts that pass thro' the
front pieces & the arms on which it rests. The receiver
is confined in its place by a tie at the ends which con
fine it to the grating. To work the moulds they are pla
ced on a slide that works horizontally under the grating.
This slide is a square frame with about thirty inches long,
& twenty inches wide. A floor, fifteen inches wide, is plac
ed upon that end of the slide which works under the machine,
the upper side of the floor forming a level with the upper
side of the moulds as they lay in the slide. The slide works
on two bed pieces that are confined in the lower girths
of the grinder. On the upper sides of those bed-pieces are
tongues of sufficient length to accommodate the motion
of the slide, & these tongues work in corresponding grooves
in the under sides of the cross pieces of the slide. The slide
is worked by a wheel that is fifteen inches diameter, placed
in a vertical position under the the middle of the slide,
the shaft of the wheel being supported by arms that extend from the legs of the grinder. This wheel is wrapped by a
chain, the ends of which pass crosswise from the top of the
wheel to the cross pieces of the slide where they are confined.
The wheel is moved by means of a lever of about forty inches
long, attached to the end of the shaft. To press the mortar
from the receiver thro' the grating a follower is worked in
the receiver. The follower is suspended from the top
pieces of a square frame work that stands in a vertical
position in front of the grinder and encompasses the moulder
& its appendages. The follower is forced downward by a
foot pressing on a lever that works horizontally in the
lower part of the machine. This lever is suspended
from the middle of the bottom piece of the above mentioned
frame work, by a link, one end of the lever being attached
to a leg of the grinder, & the other end extending outward on
the right or left of the workman at his election. The follower
is raised by two chains which pass over pulleys that are sus-
pended from the arms of the grinder, one end of the chain
being fastened to the bottom piece of the frame work, & the
other end fastened to the shaft of the wheel. To relieve
the follower more easily from the mortar, in its motion
of rising, it is perforated thro' in two or three places, and on the
under side, leather valves are so stationed as to cover those
perforations. To operate this machine, a horse is attached
to a suitable sweep that is fixed on the top of the grinder
shaft. A sufficient quantity of mortar must be well
wrought to fill the grinder. The slide being withdrawn
& the follower raised, the pressing knives in the grinder
immediately fill the ~~grinder~~ receiver, the workman places a flas-
ket on the slide, & by the operation of the hand lever, the moulds
are carried under the grating. The workman having his
foot upon the foot lever, by a sudden pressure fills the
moulds, the hand lever being brought to its first position.

the slide is withdrawn, the follower in the same operation is raised, & the mortar again forces into the moulds. The work-man removes the basket of moulds already filled & places another on the slide. The operation is repeated. After first filling the grinder, if the clay is of a fine soft texture, it may be used in a crude state. But if the clay is of a coarse hard texture, it must be about half wrought into mortar before it is cast into the machine. —

The inventors of this machine do not claim to have discovered any improvement in the grinder, so far as its operation converts clay into mortar suitable for moulding bricks, but they do claim to have discovered an improvement in the grinder so far as its principles & construction & operation operate to supply a machine for moulding bricks with mortar after it is wrought.

And they further claim to have discovered a method of combining & applying the principles & power which comprise this machine, so as to produce a new effect. The mould [illegible] in the machine above specified no variation is necessary, except in the grating & the moulds, they must agree in form & size. —

Fayette, August 1[illegible]th 1827

Witnesses
Jn.o Lane
William [illegible]

Ezra [illegible]
Benjamin Hinckley

[illegible]

(1812 wds)

DRAFTSMAN'S DIVISION.

*All communications should be addressed to*
"The Commissioner of Patents,
Washington, D. C."

2—328 a.

*DEPARTMENT OF THE INTERIOR,*

United States Patent Office,

*Washington, D. C.,* ..., *189*...

*SIR:*

*The printed* Copies *of Patent No* E Fisk
June 4 1826 are *exhausted.*

*As soon as printed a copy will be mailed you to complete your order.*

*By direction of the Commissioner:*

*Very respectfully,*

*Chief Clerk.*

3143b6-97-5m